(No Model.)
A. VAN ALLEN.
BALL TRAP.
No. 300,415. Patented June 17, 1884.
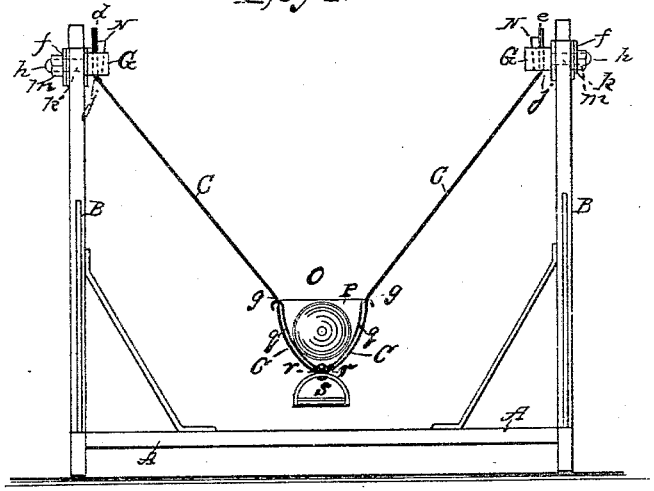
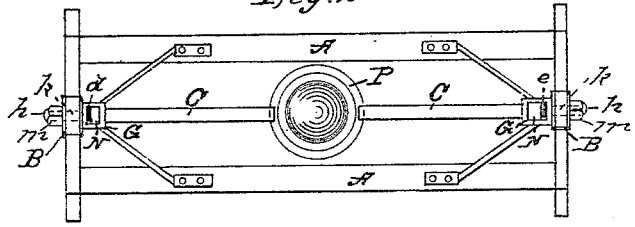
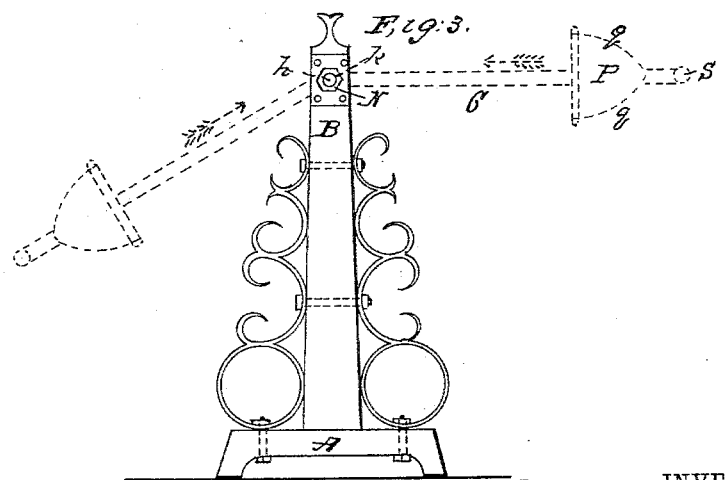
WITNESSES:
INVENTOR
Abraham Van Allen.
BY
ATTORNEYS

UNITED STATES PATENT OFFICE.

ABRAHAM VAN ALLEN, OF NEW YORK, N. Y.

BALL-TRAP.

SPECIFICATION forming part of Letters Patent No. 300,415, dated June 17, 1884.

Application filed March 13, 1884. (No model.)

*To all whom it may concern:*

Be it known that I, ABRAHAM VAN ALLEN, a citizen of the United States, and a resident of New York, in the county of New York and State of New York, have invented certain new and useful Improvements in Ball-Throwing Apparatus, of which the following is a specification.

The object of my invention is to produce a simple, cheap, and easily-operated apparatus for throwing rubber, glass, or any other kind of balls.

My invention consists of a bed or foot piece, two standards, between which (the two standards) is swung an elastic thrower with a ball-holder and handle.

In order to more fully describe my invention, I will refer to the drawings, of which Figure 1 is an elevation. Fig. 2 is a plan. Fig. 3 is an end elevation.

A represents the bed-plate, made of iron or wood, solid or skeleton. On this bed-plate are fastened the two uprights B B, made of either wood or metal, and may be ornamented as taste may suggest.

Between the standards is swung the elastic thrower C. The ends $d$ and $e$ of the thrower C are held to the standards at $f$ by means of the holders G, which consist of stems $h$, which are provided with openings $j$. These holders are inserted into the standards through holes $k$, and held thereto by nuts $m$. These holders are not rigidly fastened to the standard, but are permitted to oscillate with the movement of the elastic thrower C. When the ends $d$ and $e$ are inserted into the holes $j$ of the holders G, they are held thereto by the wedges N. The object of this mode of fastening the ends of the thrower is to allow said thrower to be lengthened or shortened.

Although I show this mode of fastening, I do not confine myself thereto, as other devices can be used, such as set-screws, &c.

To the thrower at O is fastened the flexible cup-shaped holder P, consisting of the curved sides $q\ q$, bent into the shape shown in Fig. 1. This holder P is attached or fastened to the thrower C at point $r$, passing through holes $g$ $g$ inside of same. Now, the object of making the holder flexible like rubber or steel is that when the ball is placed therein and the thrower drawn out, as shown in dotted line, (see Fig. 3,) the sides $q\ q$ will be pressed in and against the ball and hold it in place until the thrower is released, when the sides will return to their natural position and release their hold on ball and allow it to be thrown out by the elastic thrower in the direction of arrow-points, Fig. 3. The holder P can be made of one piece or of two separate pieces hinged together. The holder can be made of rubber or sheet steel, iron, or other material.

To the bottom of the holder P is fastened the handle S, of the shape most applicable for use.

The operation of my apparatus is obvious. Simply place a ball in the flexible cup-shaped holder P, which may be of any size, as the V-shaped sides of the holder allow the holder to take in and hold any sized ball. Then take hold of the handle S and draw the thrower out, as shown in dotted line, Fig. 3. The thrower, being fastened to the movable holders G, is allowed to be raised to any angle, for the purpose of throwing the ball at any fixed object. After the thrower has been drawn out and its relative position determined, it is released, and the ball is consequently thrown therefrom.

Having thus described my invention, I desire to claim—

In a toy ball-thrower, the bed-plate A, the standards B B, having holders G attached thereto, the elastic ball-thrower C, fastened to the said holders G, and having a flexible cup-shaped ball-holder, P, and handle S fastened thereto, all arranged and combined substantially as and for the purpose set forth.

Signed at New York, in the county of New York and State of New York, this 7th day of March, A. D. 1884.

ABRAHAM VAN ALLEN.

Witnesses:
C. TH. WAGNER,
CHRISTIAN WEBER.